US010528682B2

(12) United States Patent
Kumar et al.

(10) Patent No.: US 10,528,682 B2
(45) Date of Patent: Jan. 7, 2020

(54) AUTOMATIC PERFORMANCE CHARACTERIZATION OF A NETWORK-ON-CHIP (NOC) INTERCONNECT

(71) Applicant: NetSpeed Systems, San Jose, CA (US)

(72) Inventors: Sailesh Kumar, San Jose, CA (US); Eric Norige, East Lansing, MI (US); Pier Giorgio Raponi, San Jose, CA (US)

(73) Assignee: NetSpeed Systems, San Jose, CA (US)

( * ) Notice: Subject to any disclaimer, the term of this patent is extended or adjusted under 35 U.S.C. 154(b) by 897 days.

(21) Appl. No.: 14/477,764

(22) Filed: Sep. 4, 2014

(65) Prior Publication Data

US 2017/0061041 A1 Mar. 2, 2017

(51) Int. Cl.
*H04L 17/02* (2006.01)
*G06F 17/50* (2006.01)

(52) U.S. Cl.
CPC ................................ *G06F 17/5009* (2013.01)

(58) Field of Classification Search
CPC .................................................. G06F 17/5009
See application file for complete search history.

(56) References Cited

U.S. PATENT DOCUMENTS 5,432,785 A 7/1995 Ahmed et al.
5,764,741 A 6/1998 Holender
5,991,308 A 11/1999 Fuhrmann et al.
6,003,029 A 12/1999 Agrawal et al.
6,249,902 B1 6/2001 Igusa et al.
6,415,282 B1 7/2002 Mukherjea et al.
6,925,627 B1 8/2005 Longway et al.
7,065,730 B2 6/2006 Alpert et al.
7,318,214 B1 1/2008 Prasad et al.
7,590,959 B2 9/2009 Tanaka
7,725,859 B1 5/2010 Lenahan et al.
7,808,968 B1 10/2010 Kalmanek, Jr. et al.
7,917,885 B2 3/2011 Becker
8,050,256 B1 11/2011 Bao et al.
8,059,551 B2 11/2011 Milliken
8,099,757 B2 1/2012 Riedle et al.
8,136,071 B2 3/2012 Solomon (Continued)

FOREIGN PATENT DOCUMENTS

CN 103684961 A 3/2014
WO 2014059024 A1 4/2014

OTHER PUBLICATIONS

Gwangsun Kim, John Kim Kaist "Memory-centric System Interconnect Design with Hybrid Memory Cubes", 2013 IEEE, p. 145-155.*

(Continued)

*Primary Examiner* — Timothy A Mudrick
*Assistant Examiner* — Abdou K Seye
(74) *Attorney, Agent, or Firm* — Spectrum IP Law Group LLC

(57) ABSTRACT

Methods, systems, and non-transitory computer readable medium for automatically characterizing performance of a System-on-Chip (SoC) and/or Network-on-Chip (NoC) with respect to latency and throughput attributes of one or more traffic flows/profiles under varying traffic load conditions. The characterization of performance may involve a plot representative of latency and throughput, depending on the desired implementation.

20 Claims, 13 Drawing Sheets

500
Select One or More Traffic Profiles/Flows for Conducting Performance Characterization 502
Perform, for Each Selected Traffic Profile/Flow, Simulation by Varying Traffic Load 504
Graphically Represent Latency and/or Throughput Values for Each Selected Traffic Profile/Flow 506
Analyze One or More Graphs for Characterizing Performance of One or Combination of Traffic Profiles/Flows 508

700
Throughput
Latency
Latency Throughput
Load

(56) References Cited

U.S. PATENT DOCUMENTS 8,281,297 B2 10/2012 Dasu et al.
8,312,402 B1 11/2012 Okhmatovski et al.
8,407,167 B1 * 3/2013 Abts .................. G06F 12/0813 706/13
8,448,102 B2 5/2013 Kornachuk et al.
8,492,886 B2 7/2013 Or-Bach et al.
8,541,819 B1 9/2013 Or-Bach et al.
8,543,964 B2 9/2013 Ge et al.
8,601,423 B1 12/2013 Philip et al.
8,635,577 B2 1/2014 Kazda et al.
8,667,439 B1 3/2014 Kumar et al.
8,705,368 B1 * 4/2014 Abts ....................... H04L 47/10 370/238
8,717,875 B2 5/2014 Bejerano et al.
2002/0071392 A1 6/2002 Grover et al.
2002/0073380 A1 6/2002 Cooke et al.
2002/0095430 A1 7/2002 Egilsson et al.
2003/0063605 A1 * 4/2003 Ravi ....................... H04L 45/24 370/389
2004/0216072 A1 10/2004 Alpert et al.
2005/0147081 A1 7/2005 Acharya et al.
2006/0161875 A1 7/2006 Rhee
2006/0268909 A1 11/2006 Langevin et al.
2007/0088537 A1 4/2007 Lertora et al.
2007/0118320 A1 5/2007 Luo et al.
2007/0244676 A1 10/2007 Shang et al.
2007/0256044 A1 11/2007 Coryer et al.
2007/0267680 A1 11/2007 Uchino et al.
2008/0072182 A1 3/2008 He et al.
2008/0120129 A1 5/2008 Seubert et al.
2009/0070726 A1 3/2009 Mehrotra et al.
2009/0268677 A1 10/2009 Chou et al.
2009/0313592 A1 12/2009 Murali et al.
2010/0040162 A1 2/2010 Suehiro
2011/0022754 A1 1/2011 Cidon et al.
2011/0035523 A1 2/2011 Feero et al.
2011/0060831 A1 3/2011 Ishii et al.
2011/0072407 A1 3/2011 Keinert et al.
2011/0154282 A1 6/2011 Chang et al.
2011/0191774 A1 * 8/2011 Hsu ........................ G06F 17/50 718/100
2011/0276937 A1 11/2011 Waller
2012/0022841 A1 1/2012 Appleyard
2012/0023473 A1 1/2012 Brown et al.
2012/0026917 A1 2/2012 Guo et al.
2012/0099475 A1 4/2012 Tokuoka
2012/0110541 A1 5/2012 Ge et al.
2012/0155250 A1 6/2012 Carney et al.
2013/0028090 A1 1/2013 Yamaguchi et al.
2013/0051397 A1 2/2013 Guo et al.
2013/0080073 A1 3/2013 de Corral
2013/0103369 A1 4/2013 Huynh et al.
2013/0151215 A1 6/2013 Mustapha
2013/0159944 A1 6/2013 Uno et al.
2013/0174113 A1 7/2013 Lecler et al.
2013/0185038 A1 * 7/2013 Radu .................. G06F 11/3447 703/2
2013/0207801 A1 8/2013 Barnes
2013/0215733 A1 * 8/2013 Jiang ....................... H04L 47/12 370/216
2013/0219148 A1 8/2013 Chen et al.
2013/0263068 A1 10/2013 Cho et al.
2013/0326458 A1 12/2013 Kazda et al.
2014/0068132 A1 3/2014 Philip et al.
2014/0092740 A1 4/2014 Wang et al.
2014/0098683 A1 4/2014 Kumar et al.
2014/0115218 A1 4/2014 Philip et al.
2014/0115298 A1 4/2014 Philip et al.
2015/0382231 A1 * 12/2015 Jabbar .................. H04W 24/08 370/230

OTHER PUBLICATIONS

Abts, D., et al., Age-Based Packet Arbitration in Large-Radix k-ary n-cubes, Supercomputing 2007 (SC07), Nov. 10-16, 2007, 11 pgs.
Das, R., et al., Aergia: Exploiting Packet Latency Slack in On-Chip Networks, 37th International Symposium on Computer Architecture (ISCA '10), Jun. 19-23, 2010, 11 pgs.
Ebrahimi, E., et al., Fairness via Source Throttling: A Configurable and High-Performance Fairness Substrate for Multi-Core Memory Systems, ASPLOS '10, Mar. 13-17, 2010, 12 pgs.
Grot, B., Preemptive Virtual Clock: A Flexible, Efficient, and Cost-Effective QOS Scheme for Networks-on-Chip, Micro '09, Dec. Dec. 16, 2009, 12 pgs.
Grot, B., Kilo-NOC: A Heterogeneous Network-on-Chip Architecture for Scalability and Service Guarantees, ISCA '11, Jun. 4-8, 2011, 12 pgs.
Grot, B., Topology-Aware Quality-of-Service Support in Highly Integrated Chip Multiprocessors, 6th Annual Workshop on the Interaction between Operating Systems and Computer Architecture, Jun. 2006, 11 pgs.
Jiang, N., et al., Performance Implications of Age-Based Allocations in On-Chip Networks, CVA MEMO 129, May 24, 2011, 21 pgs.
Lee, J. W., et al., Globally-Synchronized Frames for Guaranteed Quality-of-Service in On-Chip Networks, 35th IEEE/ACM International Symposium on Computer Architecture (ISCA), Jun. 2008, 12 pgs.
Lee, M. M., et al., Approximating Age-Based Arbitration in On-Chip Networks, PACT '10, Sep. 11-15, 2010, 2 pgs.
Li, B., et al., CoQoS: Coordinating QoS-Aware Shared Resources in NoC-based SoCs, J. Parallel Distrib. Comput., 71 (5), May 2011, 14 pgs.
International Search Report and Written Opinion for PCT/US2013/064140, dated Jan. 22, 2014, 9 pgs.
International Search Report and Written Opinion for PCT/US2014/012003, dated Mar. 26, 2014, 9 pgs.
International Search Report and Written Opinion for PCT/US2014/012012, dated May 14, 2014, 9 pgs.
Ababei, C., et al., Achieving Network on Chip Fault Tolerance by Adaptive Remapping, Parallel & Distributed Processing, 2009, IEEE International Symposium, 4 pgs.
Beretta, I, et al., A Mapping Flow for Dynamically Reconfigurable Multi-Core System-on-Chip Design, IEEE Transactions on Computer-Aided Design of Integrated Circuits and Systems, Aug. 2011, 30(8), pp. 1211-1224.
Gindin, R., et al., NoC-Based Fpga: Architecture and Routing, Proceedings of the First International Symposium on Networks-on-Chip (NOCS'07), May 2007, pp. 253-262.
Yang, J., et al., Homogeneous NoC-based FPGA: The Foundation for Virtual FPGA, 10th IEEE International Conference on Computer and Information Technology (CIT 2010), Jun. 2010, pp. 62-67.
International Search Report and Written Opinion for PCT/US2014/023625, dated Jul. 10, 2014, 9 pgs.

* cited by examiner

AUTOMATIC PERFORMANCE CHARACTERIZATION OF A NETWORK-ON-CHIP (NOC) INTERCONNECT

BACKGROUND

Technical Field

Methods and example implementations described herein are directed to an interconnect architecture, and more specifically, to implementation of the automatic performance characterization of a Network on Chip (NoC) interconnect and/or a System on Chip (SoC) architecture.

Related Art

The number of components on a chip is rapidly growing due to increasing levels of integration, system complexity and shrinking transistor geometry. Complex System-on-Chips (SoCs) may involve a variety of components e.g., processor cores, DSPs, hardware accelerators, memory and I/O, while Chip Multi-Processors (CMPs) may involve a large number of homogenous processor cores, memory and I/O subsystems. In both SoC and CMP systems, the on-chip interconnect plays a role in providing high-performance communication between the various components. Due to scalability limitations of traditional buses and crossbar based interconnects, Network-on-Chip (NoC) has emerged as a paradigm to interconnect a large number of components on the chip. NoC is a global shared communication infrastructure made up of several routing nodes interconnected with each other using point-to-point physical links denoting connectivity and direction of data flow within the SoC and the NoC.

Messages are injected by the source and are routed from the source node to the destination over multiple intermediate nodes and physical links. The destination node then ejects the message and provides the message to the destination. For the remainder of this application, the terms 'components', 'blocks', 'hosts' or 'cores' will be used interchangeably to refer to the various system components, which are interconnected using a NoC. Terms 'routers' and 'nodes' will also be used interchangeably. Without loss of generalization, the system with multiple interconnected components will itself be referred to as a 'multi-core system'.

There are several topologies in which the routers can connect to one another to create the system network. Bi-directional rings (as shown in FIG. 1(*a*)), 2-D (two dimensional) mesh (as shown in FIGS. 1(*b*)) and 2-D Torus (as shown in FIG. 1(*c*)) are examples of topologies in the related art. Mesh and Torus can also be extended to 2.5-D (two and half dimensional) or 3-D (three dimensional) organizations. FIG. 1(*d*) shows a 3D mesh NoC, where there are three layers of 3×3 2D mesh NoC shown over each other. The NoC routers have up to two additional ports, one connecting to a router in the higher layer, and another connecting to a router in the lower layer. Router 111 in the middle layer of the example has both ports used, one connecting to the router at the top layer and another connecting to the router at the bottom layer. Routers 110 and 112 are at the bottom and top mesh layers respectively, therefore they have only the upper facing port 113 and the lower facing port 114 respectively connected.

Packets are message transport units for intercommunication between various components. Routing involves identifying a path composed of a set of routers and physical links of the network over which packets are sent from a source to one or more destination components. Components are connected to one or multiple ports of one or multiple routers; with each such port having a unique ID. Packets carry the destination's router and port ID for use by the intermediate routers to route the packet to the destination components.

Examples of routing techniques include deterministic routing, which involves choosing the same path from A to B for every packet. This form of routing is independent from the state of the network and does not load balance across path diversities, which might exist in the underlying network. However, such deterministic routing may implemented in hardware, maintains packet ordering and may be rendered free of network level deadlocks. For example, shortest path routing may minimize the latency, as such routing reduces the number of hops from a source to one or more destination(s) and/or reduces the cost of routing a packet from the source to destination(s), wherein the cost of routing depends on bandwidth available between one or more intermediate elements/channels. For this reason, the shortest path may also be the lowest power path for communication between the two components. Dimension-order routing is a form of deterministic shortest path routing in 2-D, 2.5-D, and 3-D mesh networks. In this routing scheme, messages are routed along each coordinates in a particular sequence until the message reaches the final destination. For example in a 3-D mesh network, one may first route along the X dimension until it reaches a router whose X-coordinate is equal to the X-coordinate of the destination router. Next, the message takes a turn and is routed in along Y dimension and finally takes another turn and moves along the Z dimension until the message reaches the final destination router. Dimension ordered routing may be minimal turn and shortest path routing.

FIG. 2(*a*) pictorially illustrates an example of XY routing in a two dimensional mesh. More specifically, FIG. 2(*a*) illustrates XY routing from node '34' to node '00'. In the example of FIG. 2(*a*), each component is connected to only one port of one router. A packet is first routed over the x-axis till the packet reaches node '04' where the x-coordinate of the node is the same as the x-coordinate of the destination node. The packet is next routed over the y-axis until the packet reaches the destination node.

In heterogeneous mesh topology in which one or more routers or one or more links are absent, dimension order routing may not be feasible between certain source and destination nodes, and alternative paths may have to be taken. The alternative paths may not be shortest or minimum turn.

Source routing and routing using tables are other routing options used in NoC. Adaptive routing can dynamically change the path taken between two points on the network based on the state of the network. This form of routing may be complex to analyze and implement.

A NoC interconnect may contain multiple physical networks. Over each physical network, there may exist multiple virtual networks, wherein different message types are transmitted over different virtual networks. In this case, at each physical link or channel, there are multiple virtual channels; each virtual channel may have dedicated buffers at both end points. In any given clock cycle, only one virtual channel can transmit data on the physical channel.

The physical channels are time sliced into a number of independent logical channels called virtual channels (VCs). VCs provide multiple independent paths to route packets, however they are time-multiplexed on the physical channels. A virtual channel holds the state needed to coordinate the handling of the flits of a packet over a channel. At a minimum, this state identifies the output channel of the current node for the next hop of the route and the state of the virtual channel (idle, waiting for resources, or active). The virtual channel may also include pointers to the flits of the packet that are buffered on the current node and the number of flit buffers available on the next node.

NoC interconnects may employ wormhole routing, wherein, a large message or packet is broken into small pieces known as flits (also referred to as flow control digits). The first flit is the header flit, which holds information about this packet's route and key message level info along with payload data and sets up the routing behavior for all subsequent flits associated with the message. Optionally, one or more body flits follows the head flit, containing the remaining payload of data. The final flit is the tail flit, which in addition to containing the last payload also performs some bookkeeping to close the connection for the message. In wormhole flow control, virtual channels are often implemented.

The term "wormhole" plays on the way messages are transmitted over the channels: the output port at the next router can be so short that received data can be translated in the head flit before the full message arrives. This allows the router to quickly set up the route upon arrival of the head flit and then opt out from the rest of the conversation. Since a message is transmitted flit by flit, the message may occupy several flit buffers along its path at different routers, creating a worm-like image.

Based upon the traffic between various end points, and the routes and physical networks that are used for various messages, different physical channels of the NoC interconnect may experience different levels of load and congestion. The capacity of various physical channels of a NoC interconnect is determined by the width of the channel (number of physical wires) and the clock frequency at which it is operating. Various channels of the NoC may operate at different clock frequencies, and various channels may have different widths based on the bandwidth requirement at the channel. The bandwidth requirement at a channel is determined by the flows that traverse over the channel and their bandwidth values. Flows traversing over various NoC channels are affected by the routes taken by various flows. In a mesh or Torus NoC, there may exist multiple route paths of equal length or number of hops between any pair of source and destination nodes. For example, in FIG. 2(*b*), in addition to the standard XY route between nodes 34 and 00, there are additional routes available, such as YX route 203 or a multi-turn route 202 that makes more than one turn from source to destination.

In a NoC with statically allocated routes for various traffic slows, the load at various channels may be controlled by intelligently selecting the routes for various flows. When a large number of traffic flows and substantial path diversity is present, routes can be chosen such that the load on all NoC channels is balanced nearly uniformly, thus avoiding a single point of bottleneck. Once routed, the NoC channel widths can be determined based on the bandwidth demands of flows on the channels. Unfortunately, channel widths cannot be arbitrarily large due to physical hardware design restrictions, such as timing or wiring congestion. There may be a limit on the maximum channel width, thereby putting a limit on the maximum bandwidth of any single NoC channel.

Additionally, wider physical channels may not help in achieving higher bandwidth if messages are short. For example, if a packet is a single flit packet with a 64-bit width, then no matter how wide a channel is, the channel will only be able to carry 64 bits per cycle of data if all packets over the channel are similar. Thus, a channel width is also limited by the message size in the NoC. Due to these limitations on the maximum NoC channel width, a channel may not have enough bandwidth in spite of balancing the routes.

To address the above bandwidth concern, multiple parallel physical NoCs may be used. Each NoC may be called a layer, thus creating a multi-layer NoC architecture. Hosts inject a message on a NoC layer; the message is then routed to the destination on the NoC layer, where it is delivered from the NoC layer to the host. Thus, each layer operates more or less independently from each other, and interactions between layers may only occur during the injection and ejection times. FIG. 3(*a*) illustrates a two layer NoC. Here the two NoC layers are shown adjacent to each other on the left and right, with the hosts connected to the NoC replicated in both left and right diagrams. A host is connected to two routers in this example—a router in the first layer shown as R1, and a router is the second layer shown as R2. In this example, the multi-layer NoC is different from the 3D NoC, i.e. multiple layers are on a single silicon die and are used to meet the high bandwidth demands of the communication between hosts on the same silicon die. Messages do not go from one layer to another. For purposes of clarity, the present application will utilize such a horizontal left and right illustration for multi-layer NoC to differentiate from the 3D NoCs, which are illustrated by drawing the NoCs vertically over each other.

In FIG. 3(*b*), a host connected to a router from each layer, R1 and R2 respectively, is illustrated. Each router is connected to other routers in its layer using directional ports 301, and is connected to the host using injection and ejection ports 302. A bridge-logic 303 may sit between the host and the two NoC layers to determine the NoC layer for an outgoing message and sends the message from host to the NoC layer, and also perform the arbitration and multiplexing between incoming messages from the two NoC layers and delivers them to the host.

In a multi-layer NoC, the number of layers needed may depend upon a number of factors such as the aggregate bandwidth requirement of all traffic flows in the system, the routes that are used by various flows, message size distribution, maximum channel width, etc. Once the number of NoC layers in NoC interconnect is determined in a design, different messages and traffic flows may be routed over different NoC layers. Additionally, one may design NoC interconnects such that different layers have different topologies in number of routers, channels and connectivity. The channels in different layers may have different widths based on the flows that traverse over the channel and their bandwidth requirements.

In a NoC interconnect, if the traffic profile is not uniform and there is a certain amount of heterogeneity (e.g., certain hosts talking to each other more frequently than the others), the interconnect performance may depend on the NoC topology and where various hosts are placed in the topology with respect to each other and to what routers they are connected to. For example, if two hosts talk to each other frequently and require higher bandwidth than other interconnects, then they should be placed next to each other. This will reduce the latency for this communication, which thereby reduces the global average latency, as well as reduce the number of router nodes and links over which the higher bandwidth of this communication must be provisioned.

With the number of on-chip components growing, and NoC and SoC being configured to support multiple traffic profile, latency and throughput of various traffic profiles and/or traffic flows that form part of such traffic profiles needs to be characterized in order to evaluate the performance/congestion of SoC agents, NoC elements, and/or the NoC channels that form part of the interconnect under varying traffic conditions.

There is therefore need for methods, systems, and mechanisms for automatically characterizing performance of SoC and NoC under different traffic conditions to optimize traffic behavior of the network.

SUMMARY

Aspects of the present disclosure are directed to methods, systems, and non-transitory computer readable medium for automatically characterizing performance of a System-on-Chip (SoC) and/or Network-on-Chip (NoC) with respect to latency and throughput attributes under different traffic conditions. In an aspect, each traffic condition can include a set of traffic profiles used by the SoC and NoC to fulfill respective condition and/or varying load that is applied for the selected traffic profile(s). Each traffic profile can also include a set of concurrent traffic flows that are active when the traffic profile is enabled, wherein each traffic flow can have a different rate, packet size, and quality of service (QoS), among other attributes.

In an aspect, method of the present disclosure comprises automatically characterizing performance of a Network on Chip (NoC) or a System on Chip (SoC) based on one or more traffic profiles comprising associated one or more heterogeneous traffic flows, and at least one of a NoC model and a SoC model, by performing one or more performance simulations for at least a subset of the associated one or more flows at one or more load levels, and measuring at least one of latency and throughput for the at least the subset of the associated one or more heterogeneous flows.

In an example implementation of the proposed method, for each traffic profile of whose performance is to be characterized as part of the NoC characterization, traffic flow rate can be varied N times, say from a first load level to a second load level to evaluate latency and/or throughput values at each of the N load levels, and a graph, can automatically be generated based on the N load levels and corresponding latency and/or throughput values to characterize the concerned traffic profile. Similarly, multiple graphs can be generated for different traffic profiles to characterize the NoC performance. One should appreciate that even through the present disclosure is being made with reference to traffic profiles, performance attributes such as latency and throughput can also be computed for one or a set of traffic flows, where each traffic flow has its own respective rate, packet size, and QoS attributes. Therefore, reference to traffic profiles should be interpreted to include a set/subset of traffic flows that form part of the interconnect architecture. Also, although the present disclosure is being explained with reference to NoC elements/channels, the proposed system/method also characterizes performance of the SoC and SoC is therefore completely within the scope of the instant disclosure.

Aspects of present disclosure are also directed to a non-transitory computer readable medium for executing instructions for carrying out performance evaluation or characterization of NoC and/or SoC under different traffic conditions such as for different traffic profile(s) or different flow rate conditions by measuring latency and/or throughput and/or bandwidth utilization of a Network on Chip (NoC) or a System on Chip (SoC) at different load levels. In an example implementation, performance evaluation or characterization of SoC and NoC can be performed by measuring and simulating latency and/or throughput values of a set of one or more heterogeneous traffic flows at one or more load levels (i.e. by applying one or more traffic flow rates for each selected heterogeneous traffic flow). Simulation, in an example implementation, can be performed for a given traffic profile/flow(s) at varying load levels (varying from a low level to a high load level) so as to determine latency/throughput values for the traffic profile/flow(s) at different load levels.

In another aspect, comparison of automatically generated performance characteristics for one or more traffic profiles/flow(s) can then be performed to identify behavior of each traffic profile under different load conditions and also to gather information about which NoC channels or SoC agents are congested at various load levels. Aggregation of performance characterization can also be performed by one or more statistical means to help evaluate aggregate latency/throughput performance of the entire NoC or of a subset of traffic profiles. Comparison/graphical plotting for recorded values of latency and throughput at different loads obtained during performance simulation can also be used to identify optimum, sub-optimal, and critical conditions for performance of NoC and/or SoC. In an example implementation, any statistical measure can be derived from the latency and throughput information collected at different load values and used for characterization of SoC and NoC.

BRIEF DESCRIPTION OF THE DRAWINGS

FIG. 2(*b*) illustrates three different routes between a source and destination nodes.

FIG. 3(*b*) illustrates the related art bridge logic between host and multiple NoC layers.

DETAILED DESCRIPTION

Figure 1A:
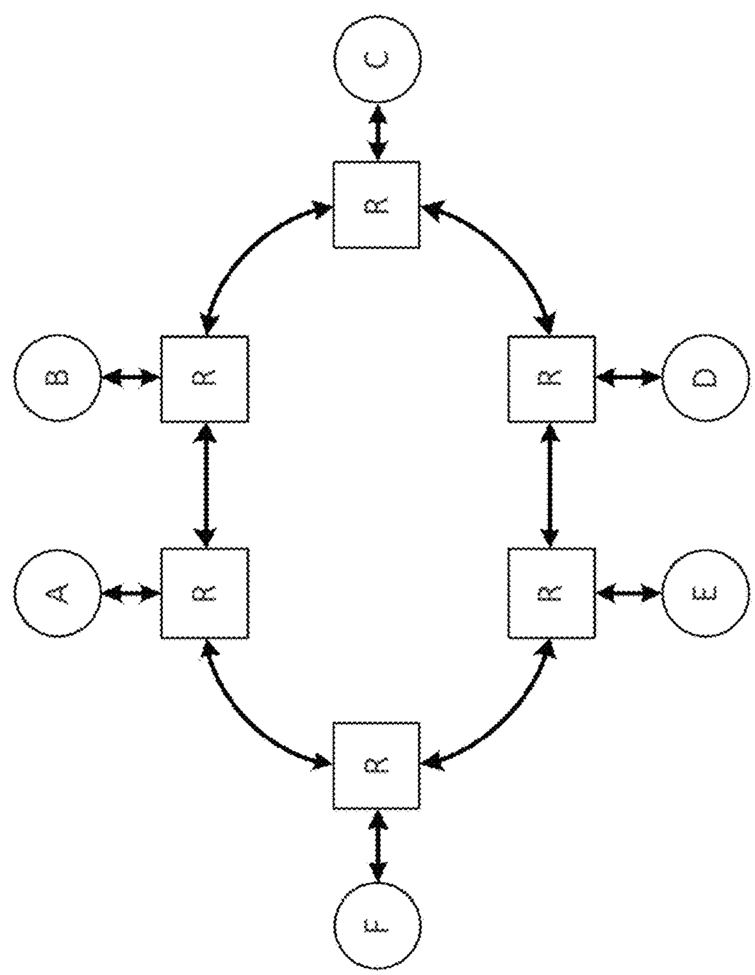
FIGS. 1(*a*), 1(*b*) 1(*c*) and 1(*d*) illustrate examples of Bidirectional ring, 2D Mesh, 2D Torus, and 3D Mesh NoC Topologies.
Figure 1B:
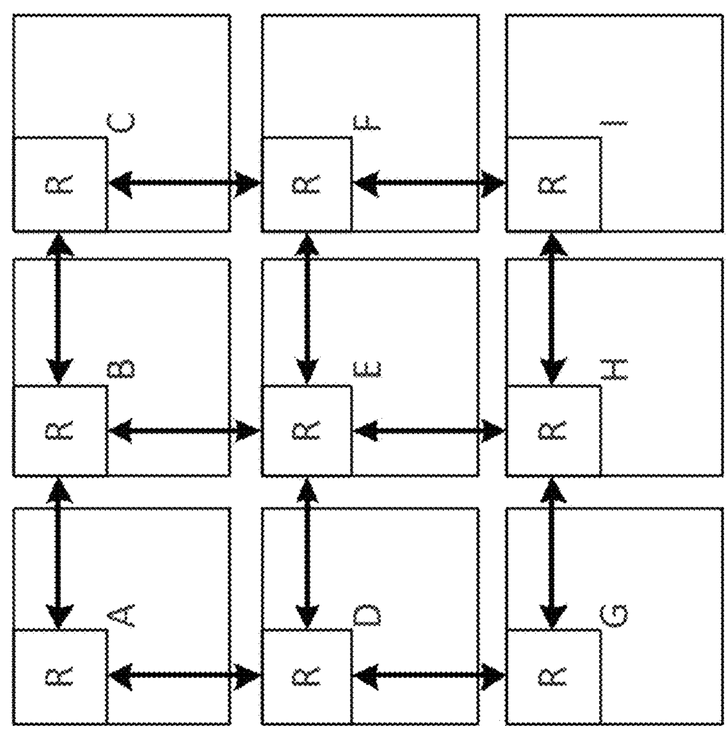
Figure 1C:
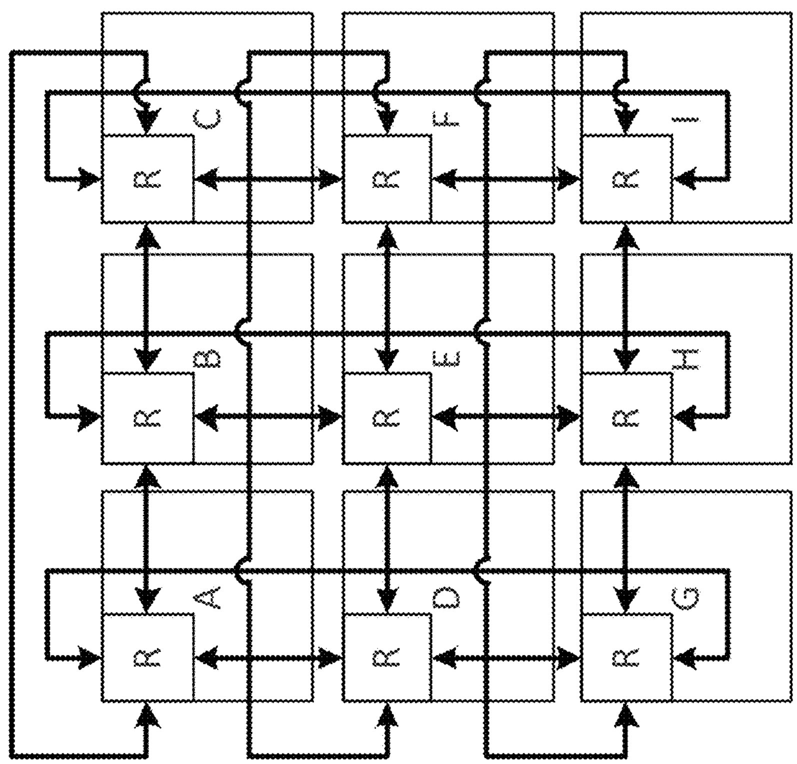
Figure 1D:
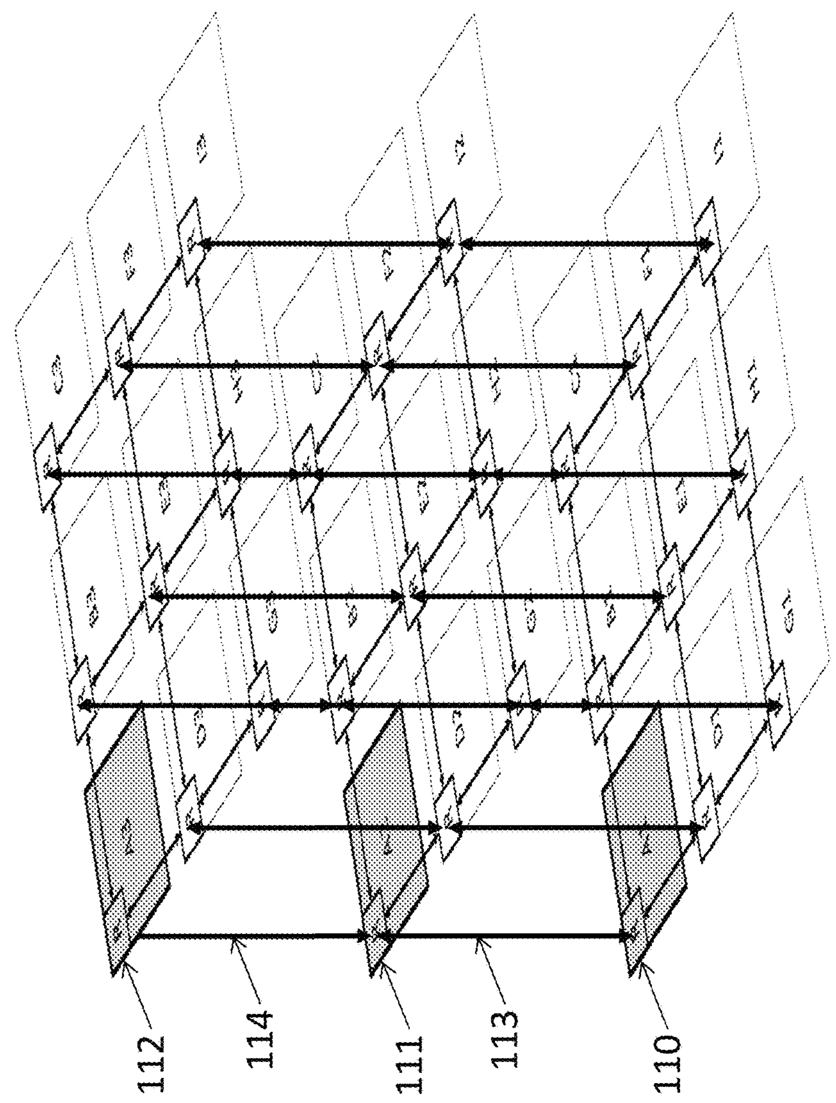
Figure 2A:
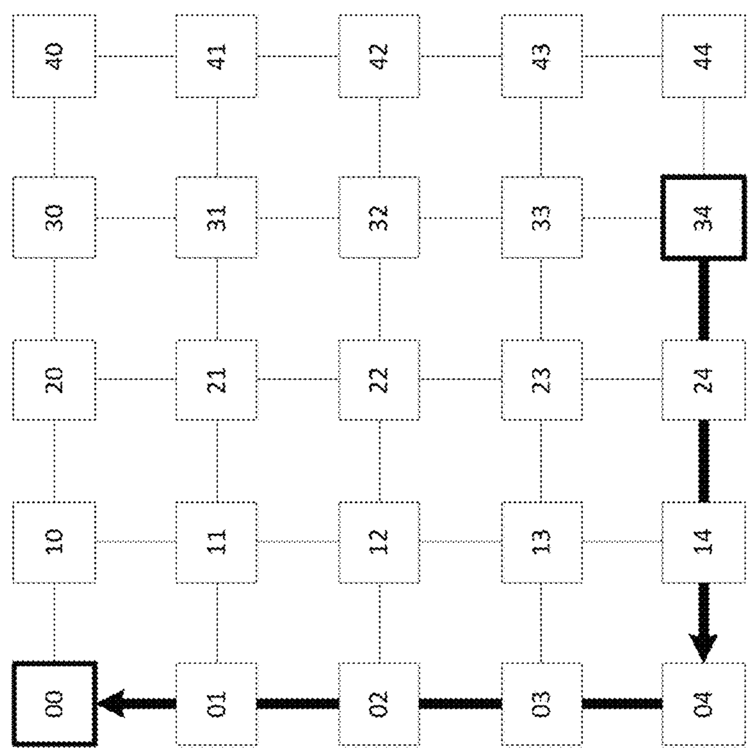
FIG. 2(*a*) illustrates an example of XY routing in a related art two dimensional mesh.
Figure 2B:
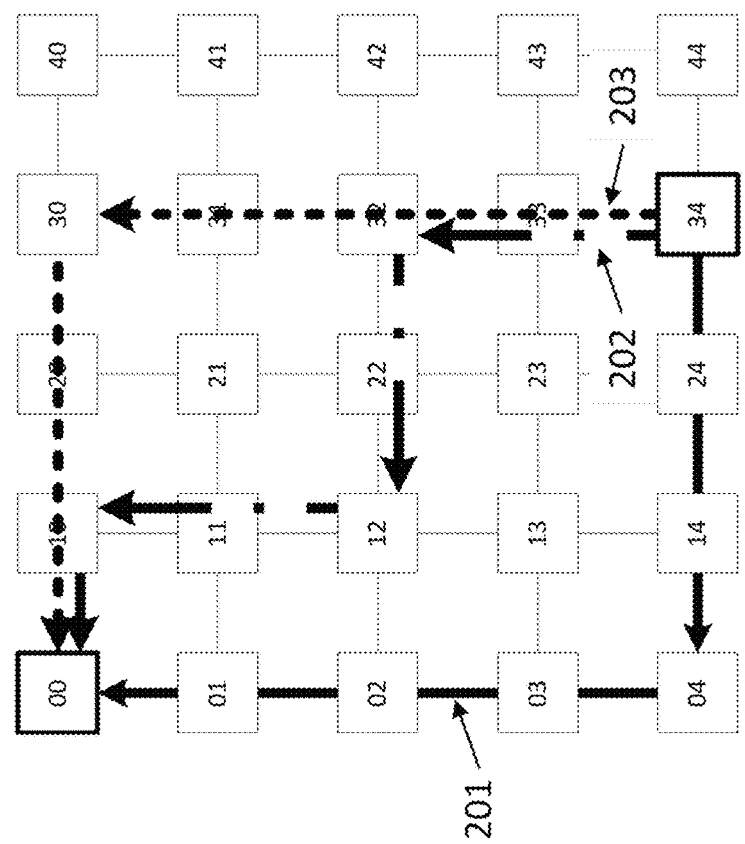
Figure 3A:
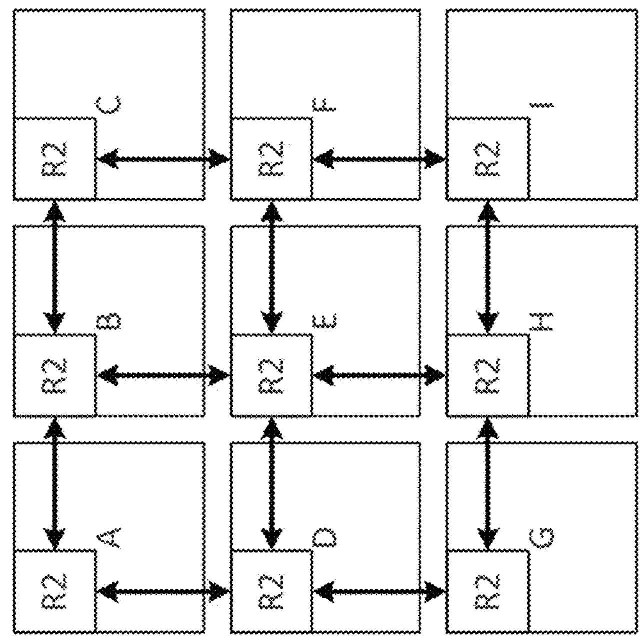
FIG. 3(*a*) illustrates an example of a related art two layer NoC interconnect.
Figure 3A:
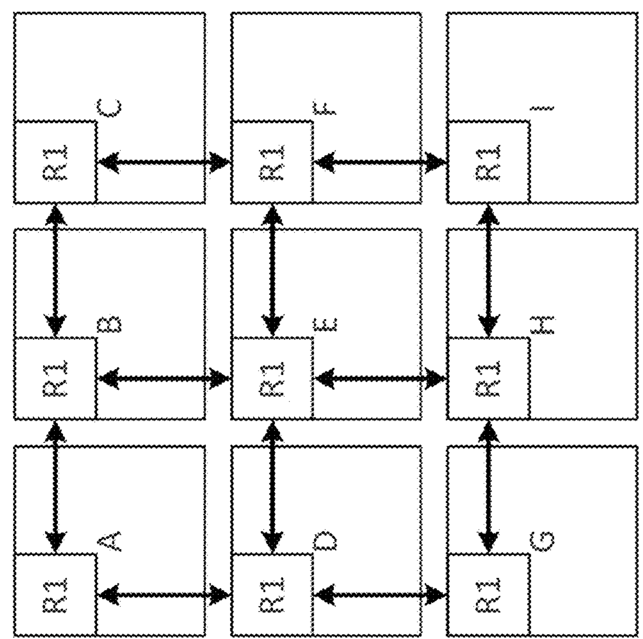
Figure 3B:
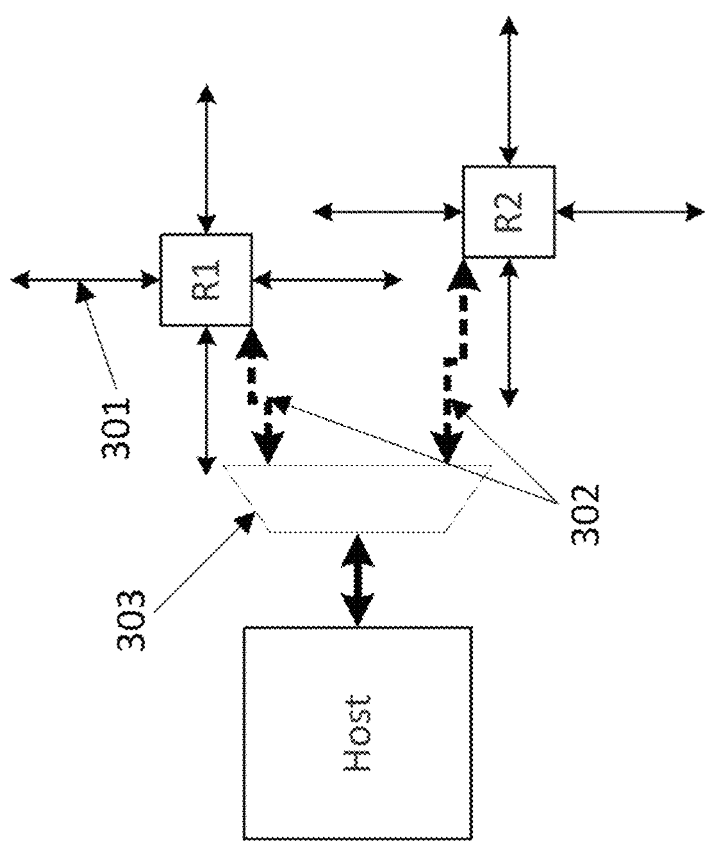

The following detailed description provides further details of the figures and example implementations of the present application. Reference numerals and descriptions of redundant elements between figures are omitted for clarity. Terms used throughout the description are provided as examples and are not intended to be limiting. For example, use of the term “automatic” may involve fully automatic or semi-automatic implementations involving user or administrator control over certain aspects of the implementation, depending on the desired implementation of one of ordinary skill in the art practicing implementations of the present application.

Aspects of the present disclosure are directed to methods, systems, and non-transitory computer readable medium for automatically characterizing performance of a System-on-Chip (SoC) and/or Network-on-Chip (NoC) with respect to latency and throughput attributes under different traffic conditions. In an aspect, each traffic condition can include a set of traffic profiles used by the SoC and NoC to fulfill respective condition and/or varying load that is applied for the selected traffic profile(s). Each traffic profile can also include a set of concurrent traffic flows that are active when the traffic profile is enabled, wherein each traffic flow can have a different rate, packet size, and quality of service (QoS), among other attributes.

In an aspect, method of the present disclosure comprises automatically characterizing performance of a Network on Chip (NoC) or a System on Chip (SoC) based on one or more traffic profiles comprising associated one or more heterogeneous traffic flows, and at least one of a NoC model and a SoC model, by performing one or more performance simulations for at least a subset of the associated one or more flows at one or more load levels, and measuring at least one of latency and throughput for the at least the subset of the associated one or more heterogeneous flows.

In an example implementation of the proposed method, for each traffic profile of whose performance is to be characterized as part of the NoC characterization, traffic flow rate can be varied N times, say from a first load level to a second load level to evaluate latency and/or throughput values at each of the N load levels, and a graph, can automatically be generated based on the N load levels and corresponding latency and/or throughput values to characterize the concerned traffic profile. Similarly, multiple graphs can be generated for different traffic profiles to characterize the NoC performance. One should appreciate that even through the present disclosure is being made with reference to traffic profiles, performance attributes such as latency and throughput can also be computed for one or a set of traffic flows, where each traffic flow has its own respective rate, packet size, and QoS attributes. Therefore, reference to traffic profiles should be interpreted to include a set/subset of traffic flows that form part of the interconnect architecture. Also, although the present disclosure is being explained with reference to NoC elements/channels, the proposed system/method also characterizes performance of the SoC and SoC is therefore completely within the scope of the instant disclosure.

In an aspect, one or more traffic/load levels can include a first load level and a second load level, with the second load being higher than the first load, and wherein the number of performance simulations, and load levels chosen for each performance simulation can be determined starting from the first load to the second load. In an instance, a traffic profile (TP) can be simulated by varying the load through scaling down and scaling up of the flow rate of the traffic profile.

In another aspect, an initial load level can be used for the first performance simulation, and the number for subsequent performance simulations, and load levels for the subsequent performance simulations can be determined based on prior performance simulations. In yet another embodiment, load levels for one or more traffic profiles/flows can be different. For instance, the number of simulations and the load at which each such simulation is conducted can be different for a first traffic profile when compared with a second traffic profile.

In another aspect, latency and/or throughput values obtained from the first load to the second load, for each associated heterogeneous flow can be automatically plotted as a graph so to obtain one or more graphs, one for each flow/traffic profile. In another aspect, the plotting can include representation of latency and/or throughput for each traffic flow/profile selected for NoC characterization with respect to varying loads.

In yet another aspect, a new traffic profile can always be selected from the set of available traffic profiles, wherein performance simulation for one or more flows associated with the new traffic profile can be performed with respect to a first load to a second load, with the second load being higher than the first load. Another aspect further comprising identifying a load capacity of the NoC or the SoC for at least the subset of the associated one or more heterogeneous flows based on the at least one of the measured latency and throughput.

In another aspect of the present disclosure, one or more heterogeneous flows, performance of whose is to be characterized can be selected based on an association to the at least one of the NoC and SoC agents or based on any other specified properties/conditions/criteria.

Aspects of present disclosure are also directed to a non-transitory computer readable medium for executing instructions for carrying out performance evaluation or characterization of NoC and/or SoC under different traffic conditions such as for different traffic profile(s) by measuring latency and/or throughput and/or bandwidth utilization of a Network on Chip (NoC) or a System on Chip (SoC) at different load levels. In an example implementation, performance evaluation or characterization of SoC and NoC can be performed by measuring and simulating latency and/or throughput values of a set of one or more heterogeneous traffic flows at one or more load levels (i.e. by applying one or more traffic flow rates for each selected heterogeneous traffic flow). Simulation, in an example implementation, can be performed for a given traffic profile/flow(s) at varying load levels (varying from a low level to a high load level) so as to determine latency/throughput values for the traffic profile/flow(s) at different load levels.

In another aspect, comparison of automatically generated performance characteristics for one or more traffic profiles/flow(s) can then be performed to identify behavior of each traffic profile under different load conditions and also to gather information about which NoC channels or SoC agents are congested at various load levels. Aggregation of performance characterization can also be performed by one or more statistical means to help evaluate aggregate latency/throughput performance of the entire NoC or of a subset of traffic profiles. Comparison/graphical plotting for recorded values of latency and throughput at different loads obtained during performance simulation can also be used to identify optimum, sub-optimal, and critical conditions for performance of NoC and/or SoC. In an example implementation, any statistical measure can be derived from the latency and throughput information collected at different load values and used for characterization of SoC and NoC.

In an aspect of the present disclosure, one or more of weighted average, average, standard deviation, or any other statistical measure can be incorporated for comparison of performance characteristics of multiple traffic flows/profiles and/or for graphical plotting of latency/throughput values at different loads for one or more traffic flows/profiles during the exercise of performance simulation. Such statistical means can also be used to identify optimal, sub-optimal, critical operating conditions, and saturation levels for performance of NoC and/or SoC such as for instance, the optimal latency/throughput levels that should be maintained for one or more traffic profiles. Such statistical measures can also be configured to represent interims of peak traffic, average traffic, throughput saturation or maximum saturation, ideal operating conditions, among any other desired parameter.

Aspects of the present application may include performance simulation methods for characterization of NoC or SoC that can be based on user-defined properties or attributes including but not limited to Quality of Service (QoS), capacity, coverage of network, packet dropping probability, guaranteed maximum probability or outage probability, among other like parameters. Such performance simulation methods can further be based on an association of one or more heterogeneous flows that can be selected for association with at least one of the NoC and SoC agents.

Aspects of the present disclosure may also include a system/processor configured to conduct performance simulations for NoC or SoC at different user defined or system defined load levels, and measure/compare/analysis latency and throughput under these different load conditions for one or a combination of traffic flows across the network and network elements and identifying optimal, sub-optimal, and critical and congestion conditions for their operations. These performance simulations at different loads and for different traffic flow rates and traffic profiles can be used for characterization of NoC or SoC and their elements.

A distributed NoC interconnects various components of a system on chip (SoC) with each other using multiple routers, bridges, and point-to-point links between the routers. NoC is also configured to support different data traffic flows for a given traffic profile specification and therefore performance of NoC in terms of latency and throughput needs to be assessed under various traffic conditions to understand information about which NoC channels, or SoC agents are congested at various load levels. Traffic conditions can include a set of traffic profiles defined by traffic specification, wherein each traffic profile can include one or more traffic flows having certain rates, QoS parameters, and packet sizes. Traffic profile specification can include information about connectivity between agents/elements/components, link/channel bandwidth information, communication protocol used by the SoCs and NoCs. Traffic profile specification can also include link capacities, data flow direction, virtual channels, and capacity of router nodes of the NoC. A variety of SoCs today are designed to run a number of different applications, and the resulting NoC traffic profile therefore may differ based on how and where the SoCs are deployed, and what applications are supported by these SoCs. Supporting a variety of traffic profiles offers several challenges in the NoC design, its optimization, and its power management. Traffic profile information may be used to determine how various transactions will be routed in the NoC topology, and accordingly make provisions for the link capacities, virtual channels, and router nodes of the NoC.

In example implementations, the design of a NoC or a SoC may be constructed from multiple traffic profiles. Performance measurement/characterization of SoC under different traffic conditions can help provide an indication of loads being supported by the SoC and the NoC for optimal throughput and latency. Based on the multiple traffic profiles, the NoC or SoC can be characterized by the latency and/or throughput supported by the design under various traffic/load conditions.

Example implementations disclosed herein are directed to characterization of the performance of a NoC or SoC system for a given a traffic specification and NoC or SoC system model. Example implementations automatically characterize the system performance by conducting performance simulations from a small load to a high load and measuring latency and throughput for some or all flows or traffic profiles of the system/network. Various statistical measurements can be derived and plotted to visualize the performance of SoC and NoC under different traffic conditions. Although the present disclosure mentions conducting simulations for one or more traffic profiles, as each traffic profile includes one or more traffic flows, simulation can also be configured on a defined set of traffic flows of one or a combination of traffic profiles, and therefore references to traffic profile can be interpreted to include traffic flows.

Figure 4:
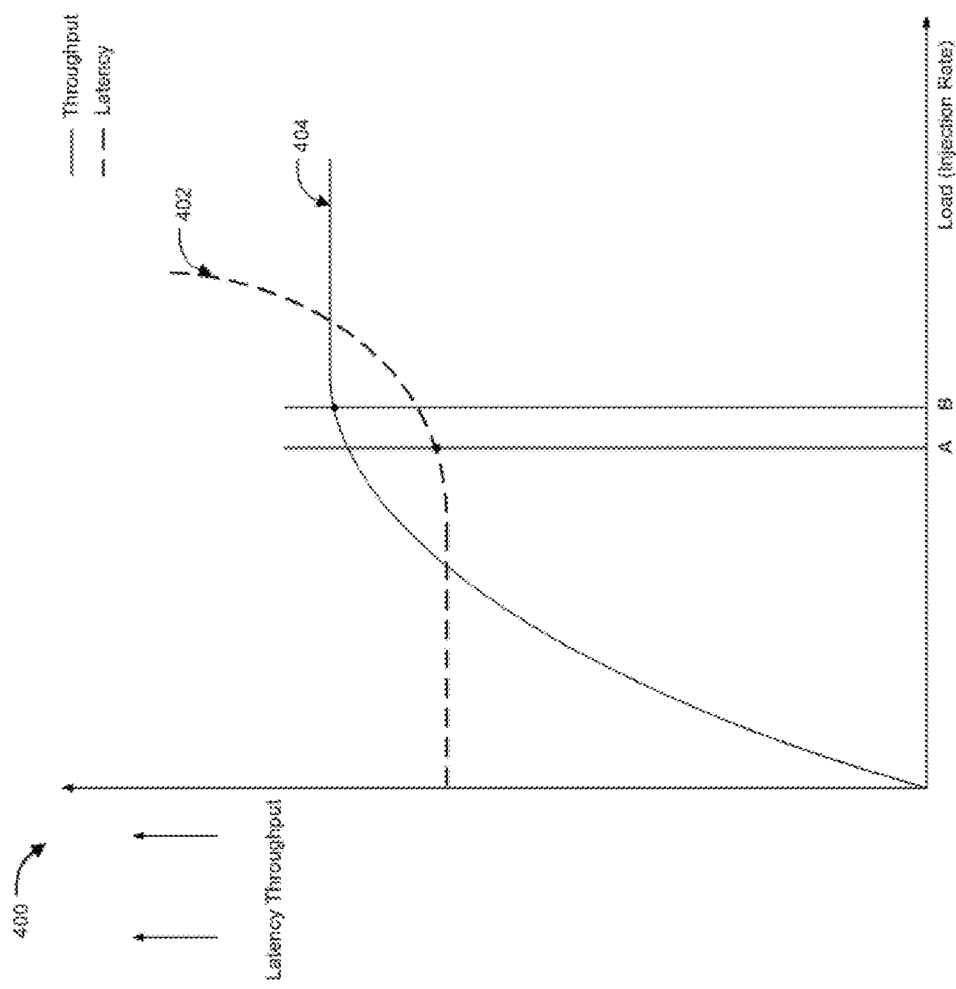
FIG. 4 illustrates an example graph of performance characterization of a NoC.

FIG. 4 illustrates an example graph 400 of performance characterization of a NoC. As shown, X-axis of the graph shows traffic load being injected into the NoC and the Y-axis represents both latency as well as throughput of the NoC with the increase in traffic load. Curve 402 shows the latency curve remains constant till the traffic load reaches a magnitude of A and then increases exponentially after load A. Curve 404, on the other hand shows the throughput that increases with the load till a load of B, and then flattens out or even decreases. Given these latency and throughput curves, aspects of the present disclosure aim to identify an optimal latency and throughput value that should be maintained and/or is desired by the NoC interconnect. Graph 400 can be configured to represent a given traffic profile or can also be configured to represent a given traffic flow of a traffic profile, wherein various load conditions are tested to identify values of performance attributes such as latency and throughput at each load condition and then plot them to compare with other such graphs for other traffic profiles/flows to identify congestion areas, optimal latency/thresholds, SoC agents/NoC elements performance, and if any design aspects needs to be changed to improve the performance characterization of the NoC.

Figure 5:
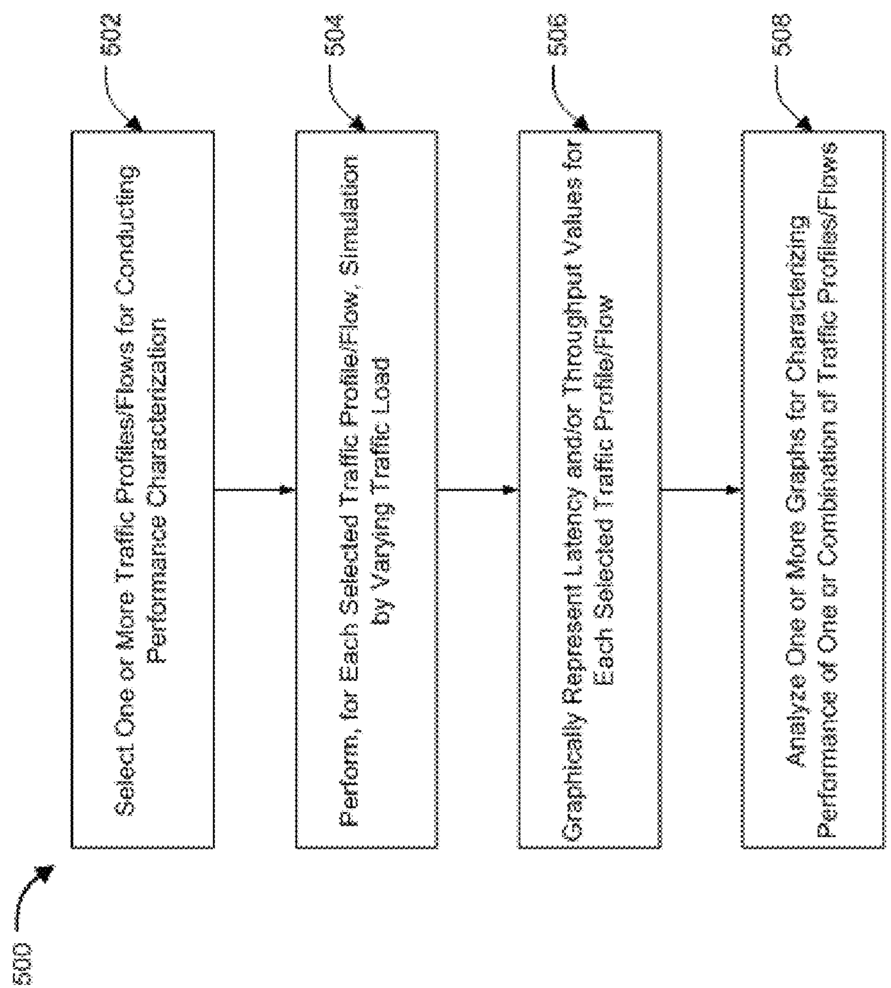
FIG. 5 illustrates an exemplary flow diagram for SoC/NoC characterization for one or more traffic profile(s) in accordance with an embodiment of the present disclosure.

FIG. 5 illustrates an exemplary flow diagram 500 for SoC/NoC characterization for one or more traffic profile(s) in accordance with an embodiment of the present disclosure. At step 502, one or more traffic profiles for which performance characterization is to be done can be identified. In an aspect, one traffic profile can be simulated, or a set of its traffic flows can be simulated, or all the traffic profiles in the complete system, or a defined set of traffic flows across various traffic profiles can be simulated, any combination of which is completely within the scope of the present disclosure.

At step 504, for each selected traffic flow, its flow rate can be automatically varied (up and down) by varying traffic load conditions in order to simulate different traffic load conditions. Such rate can be varied from a low level to a high level after different defined intervals, which are completely configurable, and can also vary for each traffic flow to be simulated. For instance, a traffic flow Fi can have a rate Ri, and its rate can be varied at 15 intervals as Ri/10, Ri/9, Ri/8, Ri/7, Ri/6, Ri/5, Ri/4, Ri/3, Ri/2, Ri/1, Ri*2, Ri*3, Ri*4, Ri*5, and Ri*6. Therefore, in an example, load can be defined as 'x' and 'y', and rate can be varied from r/x, r/(x−1), . . . , r/1, r*2, r*3, . . . , to r*y. In an aspect, any of scaling factor, interval of scaling, number of load conditions to be tested, number of iterations, load increase/decrease condition, can all be configurable and are well within the scope of the present disclosure. One should appreciate that such change in flow rate is completely exemplary in nature and any other means can be configured so as to change the flow rate by changing traffic load. For instance, N samples of varying load can be obtained by varying flow rate as r/x, r*ki/x, . . . , rkn/x. Similarly, for another traffic flow, varying load values can be configured to vary flow rate as r/x, r/x+i*k, . . . , r/x+n*k. Any mode of varying the traffic load is therefore completely within the scope of the present disclosure. In an aspect, traffic load used for varying flow rate can be configured to represent transactional level traffic. In another aspect, cycle accurate models or cycle approximate models can be incorporated to conduct performance simulation. Fully behavioral models can also be incorporated during the simulation exercise such that no clock cycle is driven.

At step 506, for each traffic flow/profile, a graph can be plotted for representing latency/throughput values for varying load conditions that are obtained at step 504 by performing rate down and rate up actions for each traffic profile. At step 508, a comparison and/or analysis can then be done between one or more traffic profiles to generate information on congestion, optimal latency/throughput values, among other performance characterization parameters. In an aspect, latency and/or throughput graphs of one or more traffic profiles can also be aggregated by averaging their latency/throughput values to obtain new graphs showing performance characterization of a combined set of traffic profiles. Similarly, graphs for one or more traffic flows of one or more traffic profiles can also be aggregated so as to enable generation of SoC/NoC model showing performance models of NoC and SoC agents. For instance, performance characterization can be done for all traffic flows from say a particular host such as CPU to a particular memory, or for all or part of traffic flows existing between memories, among other configurable network channels/paths/agents.

Figures 6A, 6B, 6C:
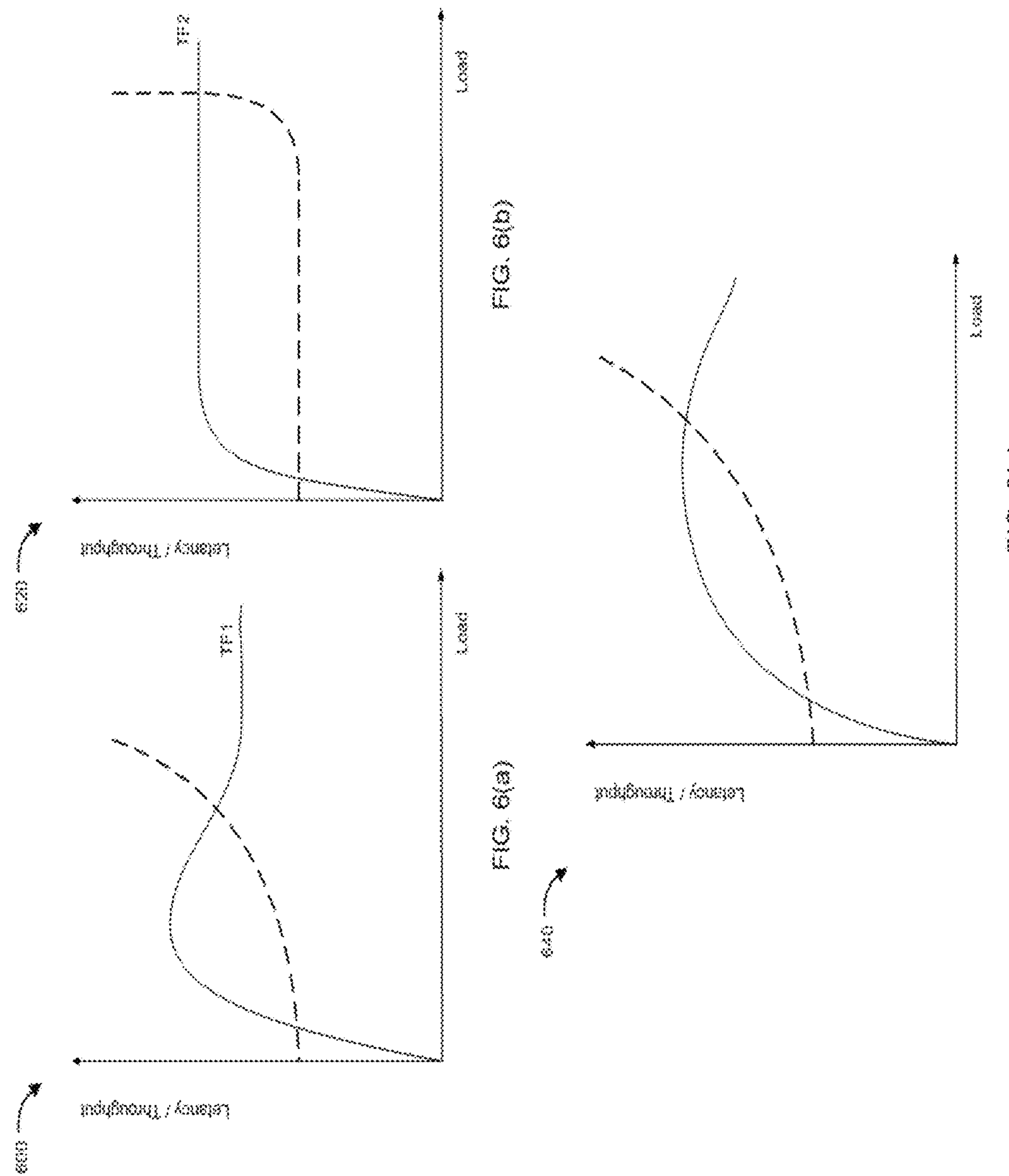
FIG. 6(*a*) through FIG. 6(*c*) illustrates an exemplary set of performance characterization graphs for different traffic flow.

FIG. 6(*a*) through FIG. 6(*c*) illustrates an exemplary set of performance characterization graphs for different traffic flow. FIG. 6(*a*) shows the performance characterization graph for traffic flow (TF1) representing latency 602 and throughput 604 curves at varying load levels from a low load to a high level. Similarly, FIG. 6(*b*) shows the performance characterization graph for traffic flow (TF2) representing latency 606 and throughput 608 curves at same load levels as for TP1. As mentioned above, the load levels, their intervals, frequency, and other parameters can always be varied for performance evaluation of each traffic profile/flow. FIG. 6(*c*) shows aggregation of performance characterization graphs for TF1 and TF2 by aggregating the latency and throughput values at each load level. As mentioned above, any number of traffic flows/profiles can be aggregated to evaluate the performance one or more parts of NoC/SoC as well as identify performance of important agents, channels, and their levels of congestion and also to determine optimal performance attributes for each or a combination of flows.

Figure 7:
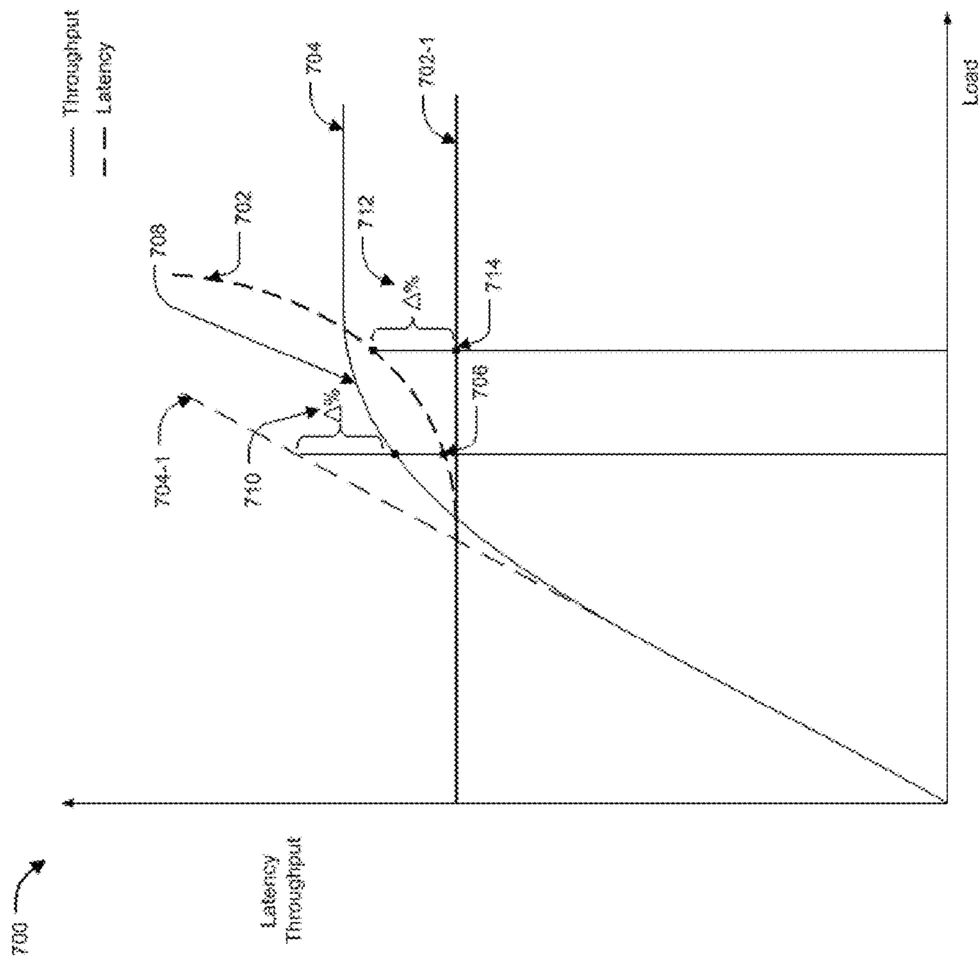
FIG. 7 illustrates another exemplary performance characterization graph of a NoC in accordance with an example embodiment of the present disclosure.

FIG. 7 illustrates another exemplary performance characterization graph 700 of a NoC in accordance with an example embodiment of the present disclosure. In the example of FIG. 7, the X-axis represents different traffic loads that can be applied on the system in incremental manner, and the y-axis represents the observed latency 702 or throughput 704 for different applied load values. Several statistical measurements using different plots such as graphs of weighted throughput and weighted latency with respect to different load values can also be plotted. Different graphical representations of statistical measures can be drawn for the given traffic condition/profiles. As can be seen from present graphs of latency 702 plotted for different traffic loads, the latency can stay static till a certain load value, and then eventually break down and increase at point 706 as the load on the SoC/NoC is increased further. Similarly, for each traffic profile or incremental value of load, throughput 704 will increase till a certain load value and then eventually stay static or get the saturation level after a point 708. As can be seen from present example illustration, at some point, the NoC or SoC reaches a saturation value where throughput does not improve further (or can even reduce) and latency increases for increasing load values. Throughput will eventually stop increasing as the load increases or may even reduce after some time as more load is applied on the SoC/NoC. At some point, latency may also grow exponentially as load is added and no performance increase occurs. The plotted graphs can be used for performance evaluation and different performance attributes/parameters can be extracted out from such graphical plots. For example, optimal load values to be applied on SoC/NoC can be decided or the ideal operating condition for each traffic profile can be identified.

Using such characterization, optimal or maximum NoC performance can be evaluated. In an example implementation, while deciding optimal condition for SoC and NoC performance, Δ% tolerance in latency performance represented by increase in latency values 712 can be acceptable, meaning that such latency value that reaches at a magnitude that is Δ% greater than ideal value represented by point 714 on ideal latency curve 702-1, can be configured as the optimal value. Similarly in an example implementation, while deciding the optimal condition for SoC and NoC performance, Δ% tolerance in throughput performance represented by reduction or saturation in throughput value 710 can be acceptable, wherein curve 704-1 can be considered as ideal curve, and a point that is exactly Δ% lesser than the corresponding ideal throughput value can be configured as being ideal throughput value.

In example implementation, performance simulation can be performed by any desired and appropriate simulation tool, wherein, for instance, example implementations of U.S. Pat. No. 9,471,726, incorporated herein by reference in its entirety for all purposes, can be utilized to generate the behavior model of the NoC or SoC agents and simulate traffic flow, which can be scaled up or down. When the traffic is generated, the traffic can be represented on a transactional level. An example of transactional level representation can be found in the example implementations of U.S. Pat. No. 9,473,359, incorporated herein by reference in its entirety for all purposes.

In example implementations, traffic flow for subset of traffic profile statistics can also be generated. For example, example implementations can be utilized to compute average throughput/latency for all the traffic flows and can also be computed based on weighted averages, depending on the desired implementation. Subsets of flows (e.g. only to memory, or to I/O, or to cache) can be isolated and performance simulations can be conducted to determine the behavior of only the desired flows. Flows that are of interest can thereby be plotted.

In another example embodiment, the traffic conditions for performance simulation for characterization of NoC or SoC system can be based on average traffic flow condition or peak traffic flow condition or traffic burstiness conditions.

In another example implementation, characterization can be done for entirety or for any subset of NoC or SoC for traffic profiles stored in memory or as specified by user depending on any desired implementation.

In another example implementation, characterization can be done for entirety or for any subset of NoC or SoC to identify ideal operating or maximum load on maximum throughput conditions.

In an example implementation, performance simulation can be based on transactional level traffic generated by the system or simulation tool for characterization of SoC and NoC for varying flow rates and provide better accuracy. In other another example implementation, cycle accurate or cycle approximate transaction level load values can be used to simulate desired traffic flow pattern for performance simulations.

In another example implementation, cycle-accurate simulator can be used for performance simulation for computer programs that simulates a micro architecture on a cycle-by-cycle basis to simulate desired traffic flow pattern for performance simulations, especially in old hardware, where requirement of time precision can be of most importance from legacy reasons.

In another example implementation, cycle-accurate simulator can be used for performance simulation when designing new systems as they can provide facility for testing and benchmarking without the requirement of building a physical chip and also allowing for easier implementation and evaluation for all design changes to meet the expected plan.

In another example implementation, any other performance simulation model based on cycle accurate simulators can be incorporated to ensure that all operations are executed in proper virtual and/or real time for branch prediction, cache misses, fetches, pipeline stalls, thread context switching and many other subtle aspects.

In another example implementation, performance simulation models can be based on fully behavioral pattern that are not based or clock cycle driven.

In example implementations, the number of loads and load levels can be predetermined or specified by the user. For subsequent performance simulations, loads can be adjusted based on results of prior performance simulations (e.g., upper bound can be set just beyond the saturation point, etc.)

Instead of straight latency/throughput, any other statistical measure such as weighted average latency, standard deviation, etc., can be utilized, and all such attributes and parameters that can be computed from such performance simulations are completely within the scope of the present disclosure. Latency statistics such as weighted average latency, latency standard deviation, etc. can be used. Throughput statistics such as weighted average throughput can also be used.

Flows are selected based on a specification of the desired properties. User can specify the properties of flows to be utilized such as the Quality of Service (QoS) attribute of the flow, bandwidth specification of the flows, message attributes such as size, type, number of data beats, etc.

Figure 8:
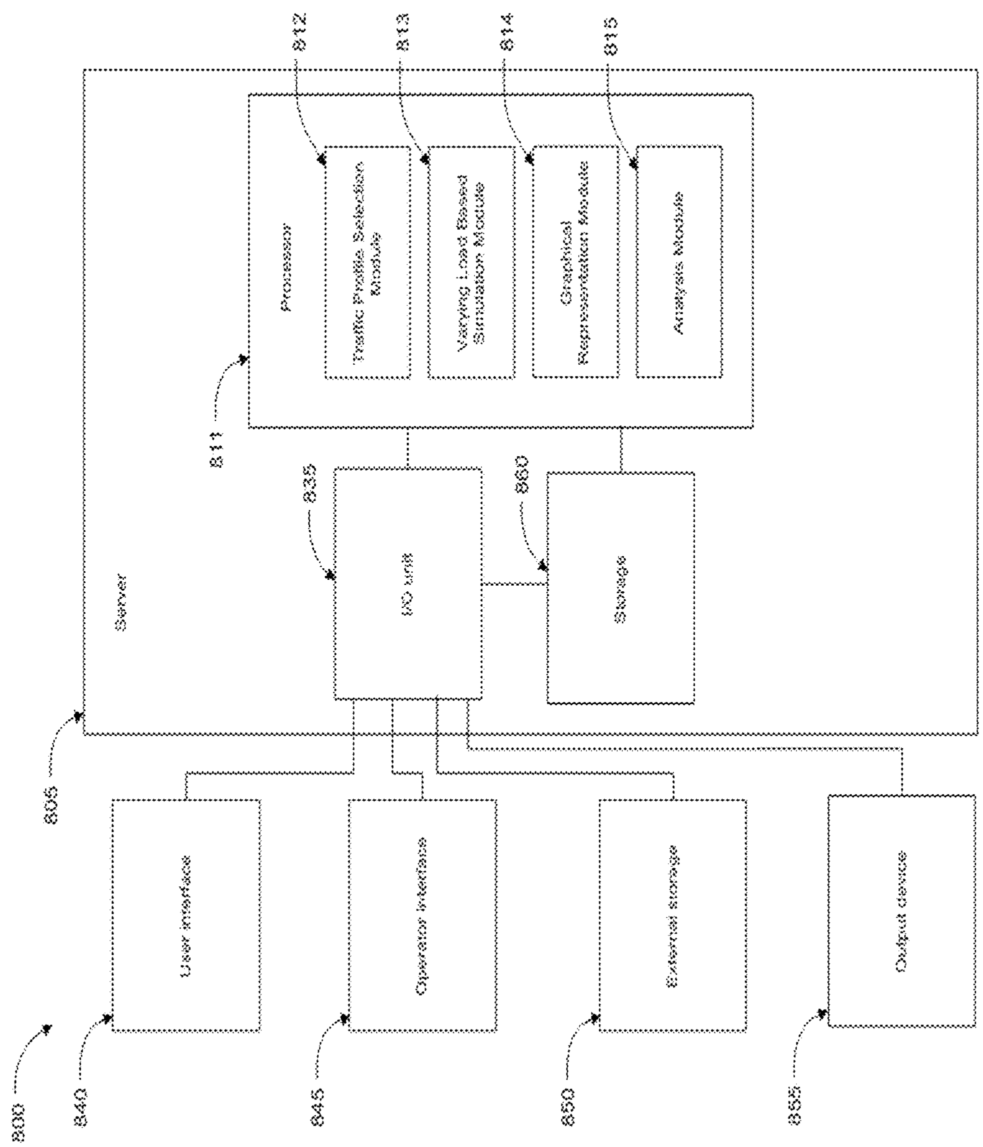
FIG. 8 illustrates an example of computer system on which example implementations can be implemented.

FIG. 8 illustrates an example computer system 800 on which example implementations may be implemented. The computer system 800 includes a server 805, which can involve an I/O unit 835, storage 860, and a processor 810 operable to execute one or more units as known to one of skill in the art. The term "computer-readable medium" as used herein refers to any medium that participates in providing instructions to processor 810 for execution, which may come in the form of computer-readable storage mediums, such as, but not limited to optical disks, magnetic disks, read-only memories, random access memories, solid state devices and drives, or any other types of tangible media suitable for storing electronic information, or computer-readable signal mediums, which can include carrier waves. The I/O unit processes input from user interfaces 840 and operator interfaces 845 which may utilize input devices such as a keyboard, mouse, touch device, or verbal command.

The server 805 may also be connected to an external storage 850, which can contain removable storage such as a portable hard drive, optical media (CD or DVD), disk media or any other medium from which a computer can read executable code. The server may also be connected an output device 855, such as a display to output data and other information to a user, as well as request additional information from a user. The connections from the server 802 to the user interface 840, the operator interface 845, the external storage 850, and the output device 855 may via wireless protocols, such as the 802.11 standards, Bluetooth® or cellular protocols, or via physical transmission media, such as cables or fiber optics. The output device 855 may therefore further act as an input device for interacting with a user.

The processor 811 may execute one or more modules including a traffic profile selection module 812, a varying load based simulation module 813, a graphical representation module 814, and an analysis module 815. Traffic profile selection module 812 can be configured to select one or more traffic profiles for which performance characterization is to be conducted. In an aspect, at a given time, one traffic profile can be simulated, or a defined set of its traffic flows can be simulated, or all the traffic profiles in the complete system can be simulated, or a defined set of traffic flows across various traffic profiles can be simulated, and therefore any combination of traffic profiles and/or flows are completely within the scope of the present disclosure.

In an aspect, varying load based simulation module 813 can be configured to, for each selected traffic flow, automatically vary its flow rate (up and down) by varying traffic load conditions in order to simulate different traffic load conditions. Such rate can be varied from say a low level to a high level after different defined intervals, which are configurable, and can also vary for each traffic flow to be simulated.

In another aspect, graphical representation module 814 can be configured to, for each traffic flow/profile, plot a graph for representing latency/throughput values for varying load conditions that are obtained from module 813 by performing rate down and rate up actions for each traffic profile. In yet another aspect, analysis module 814 can be configured to perform a comparison and/or analysis between one or more traffic profiles to generate information on congestion, optimal latency/throughput values, among other performance characterization parameters. In an aspect, latency and/or throughput graphs of one or more traffic profiles can also be aggregated by averaging their latency/throughput values to obtain new graphs showing performance characterization of a combined set of traffic profiles. Similarly, graphs for one or more traffic flows of one or more traffic profiles can also be aggregated so as to enable generation of SoC/NoC model showing performance models of NoC and SoC agents.

Furthermore, some portions of the detailed description are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the example implementations, the steps carried out require physical manipulations of tangible quantities for achieving a tangible result.

Moreover, other implementations of the present application will be apparent to those skilled in the art from consideration of the specification and practice of the example implementations disclosed herein. Various aspects and/or components of the described example implementations may be used singly or in any combination. It is intended that the specification and examples be considered as examples, with a true scope and spirit of the application being indicated by the following claims.

What is claimed is:

1. A non-transitory computer readable medium storing instructions for executing a process, the instructions comprising:

characterizing performance of a Network on Chip (NoC) or a System on Chip (SoC) based on one or more traffic profiles comprising associated one or more heterogeneous traffic flows, and at least one of a NoC model and a SoC model, by:

performing one or more performance simulations for at least a subset of the associated one or more flows at one or more load levels; and measuring at least one of latency and throughput for the at least the subset of the associated one or more heterogeneous flows;

wherein an initial load level is used for a first one of the one or more performance simulations and a number of subsequent performance simulations to be executed, wherein load levels for the subsequent performance simulations are to be determined based on the latency and the throughput gradients between the prior performance simulations in comparison with a latency curve and a throughput curve, wherein an acceptable latency value for the NoC or the SoC is to be determined based at least in part on a latency value that is a variance delta greater than an ideal latency value on the latency curve, wherein an acceptable throughput value for the NoC or the SoC is to be determined based at least in part on a throughput value that is a variance delta lesser than an ideal throughput value on the throughput curve.

2. The non-transitory computer readable medium of claim 1, wherein the one or more load levels comprise a first load and a second load, the second load being higher than the first load, and wherein a number of the one or more performance simulations and load levels chosen for each of the one or more performance simulations is determined starting from the first load to the second load.

3. The non-transitory computer readable medium of claim 1, wherein at least one of the one or more load levels for the one or more flows is different from another one of the one or more load levels for another one of the one or more flows.

4. The non-transitory computer readable medium of claim 1, wherein the instructions further comprise plotting the at least one of the latency and the throughput from the first load to the second load for the at least the subset of the associated one or more heterogeneous flows.

5. The non-transitory computer readable medium of claim 1, wherein the instructions further comprise plotting at least one of a latency statistic and a throughput statistic from the first load to the second load for the at least the subset of the associated one or more heterogeneous flows.

6. The non-transitory computer readable medium of claim 1, wherein the instructions further comprise processing a new traffic profile from the one or more traffic profiles, and performing the performance simulation for one or more flows associated with the new traffic profile from a first load to a second load, the second load being higher than the first load.

7. The non-transitory computer readable medium of claim 1, wherein the instructions further comprise identifying a load capacity of the NoC or the SoC for at least the subset of the associated one or more heterogeneous flows based on the at least one of the measured latency and throughput.

8. The non-transitory computer readable medium of claim 1, wherein the at least the subset of the associated one or more heterogeneous flows subset of flows is selected based on an association to the at least one of the NoC and SoC agents.

9. The non-transitory computer readable medium of claim 1, wherein the at least the subset of the associated one or more heterogeneous flows is selected based on one or more specified properties.

10. The non-transitory computer readable medium of claim 1, wherein a plurality of the one or more heterogeneous traffic flows is to form part of an interconnect architecture.

11. The non-transitory computer readable medium of claim 1, wherein each of the one or more heterogeneous traffic flows comprises a different rate attribute, packet size attribute, and Quality of Service (QoS) attribute.

12. A method comprising:

characterizing performance of a Network on Chip (NoC) or a System on Chip (SoC) based on one or more traffic profiles comprising associated one or more heterogeneous traffic flows, and at least one of a NoC model and a SoC model, by:

performing one or more performance simulations for at least a subset of the associated one or more flows at one or more load levels; and measuring at least one of latency and throughput for the at least the subset of the associated one or more heterogeneous flows;

wherein an initial load level is used for a first one of the one or more performance simulations and a number of subsequent performance simulations to be executed, wherein load levels for the subsequent performance simulations are to be determined based on the latency and the throughput gradients between the prior performance simulations in comparison with a latency curve and a throughput curve, wherein an acceptable latency value for the NoC or the SoC is determined based at least in part on a latency value that is a variance delta greater than an ideal latency value on the latency curve, wherein an acceptable throughput value for the NoC or the SoC is determined based at least in part on a throughput value that is a variance delta lesser than an ideal throughput value on the throughput curve.

13. The method of claim 12, wherein the one or more load levels comprise a first load and a second load, the second load being higher than the first load, and wherein a number of the one or more performance simulations and load levels chosen for each of the one or more performance simulations is determined starting from the first load to the second load.

14. The method of claim 12, wherein at least one of the one or more load levels for the one or more flows is different from another one of the one or more load levels for another one of the one or more flows.

15. The method of claim 12, further comprising plotting the at least one of the latency and the throughput from the first load to the second load for the at least the subset of the associated one or more heterogeneous flows.

16. The method of claim 12, further comprising plotting at least one of a latency statistic and a throughput statistic from the first load to the second load for the at least the subset of the associated one or more heterogeneous flows.

17. The method of claim 12, further comprising processing a new traffic profile from the one or more traffic profiles, and performing the performance simulation for one or more flows associated with the new traffic profile from a first load to a second load, the second load being higher than the first load.

18. The method of claim 12, further comprising identifying a load capacity of the NoC or the SoC for at least the subset of the associated one or more heterogeneous flows based on the at least one of the measured latency and throughput.

19. The method of claim 12, wherein the at least the subset of the associated one or more heterogeneous flows subset of flows is selected based on an association to the at least one of the NoC and SoC agents.

20. The method of claim 12, wherein the at least the subset of the associated one or more heterogeneous flows is selected based on one or more specified properties.

* * * * *